United States Patent [19]
Gabura et al.

[11] Patent Number: 5,327,082
[45] Date of Patent: Jul. 5, 1994

[54] ON LINE ELECTROMAGNETIC WEB THICKNESS MEASURING APPARATUS INCORPORATING A SERVOMECHANISM WITH OPTICAL DISTANCE MEASURING

[75] Inventors: A. James Gabura, Toronto; Ross K. MacHattie, Bolton; Larry A. McNelles, Thornhill, all of Canada

[73] Assignee: Valmet Automation (Canada) Ltd., Concord, Canada

[21] Appl. No.: 819,762

[22] Filed: Jan. 13, 1992

[51] Int. Cl.⁵ .................... G01B 7/10; G01B 11/14; G01N 21/86
[52] U.S. Cl. .................... 324/231; 250/561; 250/227.11; 324/262; 356/373; 356/375
[58] Field of Search .............. 324/229–231, 324/262; 250/559, 561; 356/373, 375, 376; 340/675

[56] References Cited

U.S. PATENT DOCUMENTS

| | | | |
|---|---|---|---|
| 3,125,624 | 3/1964 | Illig et al. | 88/14 |
| 3,137,756 | 6/1964 | Gunther et al. | 88/14 |
| 3,258,686 | 6/1966 | Selgin | 324/34 |
| 3,536,405 | 10/1970 | Flower | 356/167 |
| 3,671,726 | 6/1972 | Kerr | 235/1513 |
| 4,053,234 | 10/1977 | McFarlane et al. | 356/156 |
| 4,107,606 | 8/1978 | Typpo et al. | 324/229 |
| 4,276,480 | 6/1981 | Watson | 250/560 |
| 4,773,760 | 9/1988 | Makkonen | 356/381 |
| 4,791,367 | 12/1988 | Typpo | 324/231 X |
| 4,849,694 | 7/1989 | Coates | 324/230 |
| 5,021,666 | 6/1991 | Reber | 250/359 |
| 5,074,050 | 12/1991 | Williams | 324/229 X |
| 5,109,161 | 4/1992 | Horiuchi et al. | 250/561 |
| 5,132,619 | 7/1992 | Typpo | 324/231 |
| 5,162,661 | 11/1992 | Sato et al. | 250/561 |

FOREIGN PATENT DOCUMENTS

| | | | |
|---|---|---|---|
| 2035566 | 6/1980 | United Kingdom | 324/229 |
| 2097561 | 11/1982 | United Kingdom | 324/229 |
| 2167179 | 5/1986 | United Kingdom . | |

Primary Examiner—Gerard R. Strecker
Attorney, Agent, or Firm—Shenier & O'Connor

[57] ABSTRACT

Apparatus for measuring the thickness of a moving web of material in which a ferromagnetic core carrying a winding and a ferromagnetic disc are disposed on opposite sides of the web at constant distances therefrom with at least one of said distances being maintained by a servomechanism including an optical distance measuring device whereby the inductance of said coil is a measure of the thickness of the web.

15 Claims, 3 Drawing Sheets

ON LINE ELECTROMAGNETIC WEB THICKNESS MEASURING APPARATUS INCORPORATING A SERVOMECHANISM WITH OPTICAL DISTANCE MEASURING

FIELD OF THE INVENTION

Our invention is in the field of thickness measuring devices and more particularly in the field of on line web thickness measuring systems.

BACKGROUND OF THE INVENTION

Various devices are known in the prior art for measuring the thickness of material. In the manufacture of a web or sheet of material such as paper, on line sensors are employed for measuring the thickness of the web. In many of these systems upper and lower heads are supported on an O-frame for movement together across the web to obtain a thickness profile. In one technique, one of the two heads carries a ferro magnetic disc and the other head carries winding on a magnetic core, the reluctance of which winding varies in accordance with the separation between the disc and the core.

In some of the systems of the prior art the sensor heads are in direct contact with the upper and lower surfaces of the web, the thickness of which is to be measured. In some instances the heads incorporate diaphragms or bellows affording a flexible contact with the web. Some heads of the prior art are of special geometric design and are covered with a smooth hardened material to minimize the effect of surface and strength irregularities of the sheet caused by moisture variations, dirt or holes which otherwise would cause tears or marks in the paper coating or web breaks.

Other expedients have been employed where the web carries a soft coating or has extreme surface irregularities. Such expedients include rolling contact between the head and the web or some provision for generating an air cushion between the head and the web. For rolling contact, small diameter rollers are employed. For fast production, the small rollers travel at such high rotational velocities that frequent replacement is necessary.

In sensors of the type using an air cushion, an attempt is made to maintain the distance between the head and the sheet material constant by maintaining a constant air column. It is, however, difficult to maintain air cushion distance precisely enough for the accuracy required in the measurement of thin webs.

In yet another system of the prior art the upper and lower heads are spaced from the upper and lower surfaces of the sheet or web. The respective distances between the upper surface of the sheet and the upper head and the under surface of the sheet and the lower head are measured by optical triangulation systems. A third measurement is made of the distance between the upper and lower heads. Using these three distance measurements, the thickness of the web is calculated. While such a system avoids the problems inherent in systems in which the heads contact the surfaces of the web, it is not as accurate as is desired, particularly in the case of thin webs.

SUMMARY OF THE INVENTION

One object of our invention is to provide an on line web thickness measuring apparatus which is more accurate than are systems of the prior art.

Another object of our invention is to provide an improved on line web thickness measuring apparatus in which one or both of the sensing heads is maintained out of contact with the web.

Yet another object of our invention is to provide an improved on line web thickness measuring apparatus which is more reliable than are web thickness sensing systems of the prior art.

A still further object of our invention is to provide an improved on line web thickness measuring apparatus which is especially adapted to measuring the thickness of thin webs.

Still another object of our invention is to provide an improved on line web thickness measuring apparatus which compensates for web movement and for frame distortion.

A still further object of our invention is to provide an improved on line web thickness measuring apparatus having an optical sensor which is compensated for dust accumulation and sheet opacity changes.

Other and further objects of our invention will appear from the following description.

BRIEF DESCRIPTION OF THE DRAWINGS

In the accompanying drawings to which reference is made in the instant specification and which are to be read in conjunction therewith and in which like reference numerals are used to indicate like parts in the various views.

DESCRIPTION OF THE PREFERRED EMBODIMENT

Figure 1:
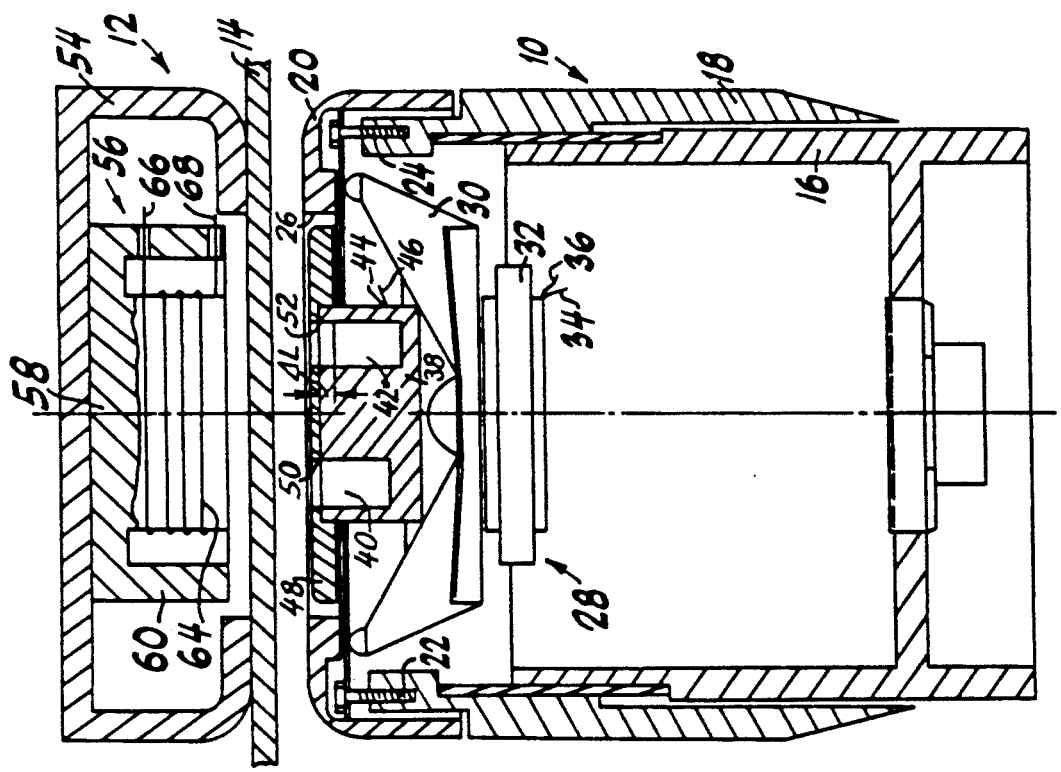
FIG. 1 is a sectional view of our improved on line web thickness sensor.

Referring now to FIG. 1, our improved web thickness sensor includes a lower head indicated generally by the reference character 10 and an upper head indicated generally by the reference character 12, both of which are associated with a web of paper or the like, the thickness of which is to be measured.

Lower head 10 includes a housing bottom portion 16 and a housing upper portion 18. The upper open end of portion 18 is covered by a cap 20 held in position by screws 22 and 24. We provide the cap 20 with a window 26.

The lower head 10 houses a servomechanism indicated generally by the reference character 28, which may for example be a loud speaker including a cone 30 and a driving mechanism 32 energized by leads 34 and 36.

The moveable cone 30 of the mechanism 28 supports a body 38 carrying a pair of distance measuring units 40 and 42 which, in a manner to be described hereinbelow, cooperate to produce an output signal on conductors 44 and 46 which, suitably modified, is applied to conductors 34 and 36 to maintain the body 38 a predetermined distance from the lower surface of the web 14.

Body 38 carries a ferrite disc 48 formed with bores 50 and 52 for accommodating the units 40 and 42. It will readily be apparent that if the body 38 is maintained at a predetermined distance from the lower surface of the web 14, the disc 48 likewise will be positioned at a predetermined distance from the lower surface of the web.

Figure 2:
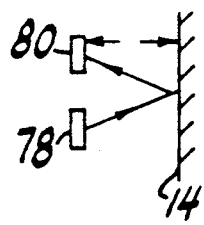
FIG. 2 is a schematic view illustrating one form of optical distance measuring device which we may utilize in our web thickness sensor.
Figure 3:
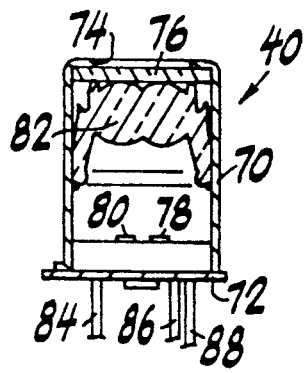
FIG. 3 is a sectional view of one of the optical distance measuring units incorporated in the form of our web thickness sensor illustrated in FIG. 1.
Figure 4:
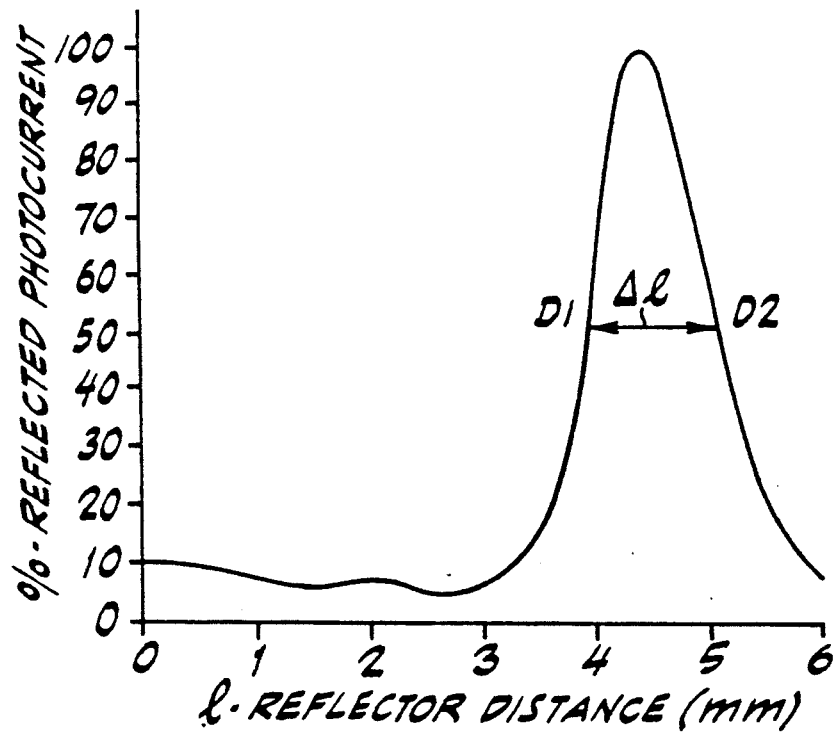
FIG. 4 is a graph of the response curve of the unit shown in FIG. 3.

Referring to FIG. 3, we have shown the details of the unit 40, it being understood that the unit 42 is identical. Unit 40 includes a housing 70 carried by a base 72 and having an opening 74 in the top thereof. A window 76 is positioned behind the opening 74. Housing 70 supports a source 78 of light of any suitable type known in the art in laterally spaced relationship to a detector 80. A lens 82 positioned in the housing 70 behind the window 76 focuses light from the source 78 onto the undersurface of the web 14. The lens 82 also focuses light reflected from the underside of the web onto the detector 80. This operation is schematically illustrated in FIG. 2. As is known in the art, the reflected light intensity as shown in FIG. 4 has a maximum with a sharp front slope and a back slope that follows a $1/d^2$ dependence, when d is the distance from the surface of the web 14 to the front surface of the device shown in FIG. 3. With such a system, the measurement sensitivity is high for small dynamic ranges. The resolution of the measurement for some short dynamic range configurations is of the order of several hundredths of a micron.

In the particular arrangement illustrated in FIG. 1, it will be noted that the devices 40 and 42 are mounted at different distances from the surface of the lower head 10. One unit is mounted a distance 3.45 mm below the surface, while the other is mounted a distance 4.65 mm below the surface. For the particular embodiment shown in FIG. 3, the position of the midpoint between these distances would be 4.3 mm from the surface of the web at the position of the apex of the response curve for units 40 and 42. Under these conditions, the unit 40 operates on the front slope of the response curve while the unit 42 operates on the back slope of the response curve. If the difference Δ 1 between the distances of the pairs 40 and 42 is 1.2 mm, with pair 40 being 3.45 mm below the surface of disc 48, and pair 42 being 4.65 mm below the surface of disc 48, then the web is at a constant distance from the surface when the signals from the two detectors are equal at a separation of about 0.25 mm between the surface of the web and the lower head 10. As the distance between the surface of the head and the web changes, the signal applied to the servomechanism 28 maintains a zero difference between the outputs of the two distance measuring units 40 and 42. If the distance is greater, the difference between the outputs or $D_2-D_1$ is negative. If the difference is smaller, the difference between the outputs of the two units is positive. With this method we provide an effective way of maintaining a fixed distance between the disk 48 carried by the non-contacting head 10 and the undersurface of the web 14.

The arrangement shown in FIG. 1 operates on the magnetic reluctance method. That is to say, as is known in the art, the reluctance across conductors 66 and 68 is determined by the proximity of the ferrite disc 48 to the ferrite core 56. Since the upper head 12 contacts the upper surface of the web 14 and the lower head 10 is maintained at a predetermined distance from the lower surface of the web 14, the reluctance between conductor 66 and 68 is a direct measure of the thickness of the web 14. The high sensitivity of this measurement extends up to 200 mil (5 mm) with the highest sensitivity in the zero to 100 mil (2.5 mm) range.

It will be seen that the winding 64 carried by the core 56 and the disc 48 comprise interacting elements for producing a sensible indication of the distance in terms of the inductance of the winding 64.

It will be appreciated that with the head 12 in contact with the upper surface of the sheet 14 and with the core 56 in a fixed position with relation to the head 12 in the embodiment shown, the core 56 is at a fixed distance from the upper surface of the sheet 14. It will be understood that the core 56 could as well be carried by a bellows or the like on head 12 with the bellows in contact with the upper surface of sheet 14. Heads 10 and 12 are supported by an O-frame (not shown) of a type known in the art. Preferably we apply a hardened coating of a type known in the art to the surface of head 12 which contacts the sheet 14.

The high sensitivity of the combination of the magnetic reluctance technique with the optical distance sensing gives an accurate measurement of paper thickness. The web pass line is maintained relative to the fixed head. Frame distortion is compensated by measuring the total head separation and by controlled movement of the lower head to maintain a constant distance to the sheet surface.

The use of two emitter/detector assemblies 40 and 42 and positioning the servomechanism 28 to maintain a zero difference between the detected light intensities compensates for dust accumulation, sheet opacity changes, reflectivity changes and color shade changes.

It is to be understood that we may if desired use the ratio of the outputs of the units 40 and 42 rather than the difference. When using the ratio $D_1/D_2$ for measurement of the distance to the paper surface at less than the set distance of 4.3 mm for example, the ratio is less than 1. At 4.3 mm the ratio is exactly 1 and at larger distances the ratio is greater than 1. The ratio signals are suitably processed to provide appropriate signals for actuating the servomechanism 28. This ratio method gives high sensitivity to the distance measurement while compensating for dust accumulation, paper opacity changes, reflectivity changes, color shade changes and detector drift.

Figure 5:
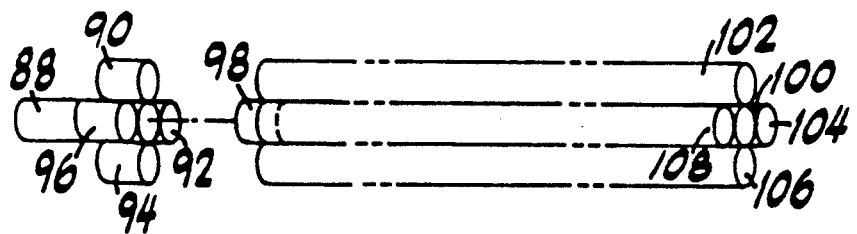
FIG. 5 is a diagrammatic view illustrating an alternate form of optical distance measuring system which we may utilize in our web thickness sensor.
Figure 6:
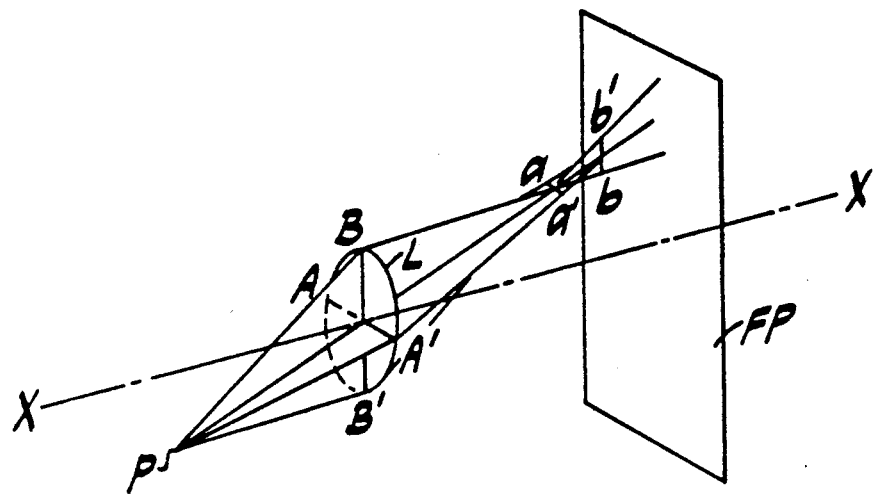
FIG. 6 is a diagrammatic view illustrating the operation of the distance measuring system illustrated in FIG. 5.
Figure 7:
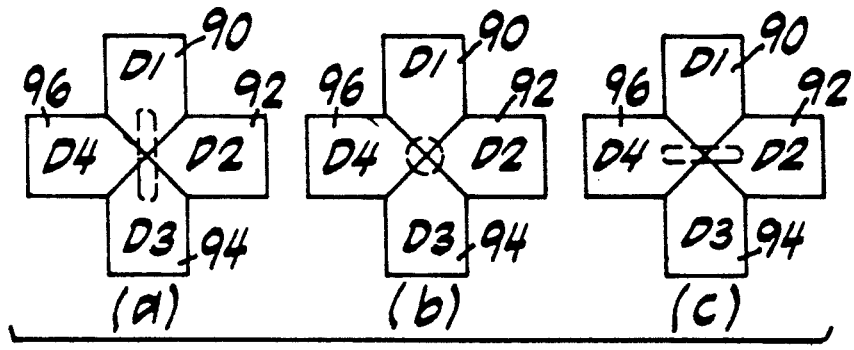
FIG. 7 is a diagrammatic view illustrating the manner of operation of the detectors in the distance measuring system illustrated in FIG. 5.

Referring now to FIGS. 5 to 7, we have shown an alternate distance measuring system. In the arrangement shown therein, we employ a laser 88 and four detectors, 90, 92, 94 and 96 arranged symmetrically around the laser. A light pipe 98 conducts the laser beam to a hologram or lens arrangement 100 on the end of the pipe. As it passes through the device 100 the laser beam becomes astigmactic forming an elliptical cross sectional shape. Light reflected from the surface of the web 14 is conducted back through light pipes 102, 104, 106 and 108 arranged symmetrically around the light pipe 98 to the respective detectors 90, 92, 94 and 96.

Referring now to FIG. 6, we have illustrated diagrammatically the operation of the optical system illustrated in FIG. 5. As has been pointed out hereinabove, the laser light from the source 88, as it emerges from the hologram 100, assumes an elliptical shape indicated by the ellipse L having a minor axis A-A', and a major axis B-B' with reference to the optical axis XX of the system. When viewed from the object point P, the ellipse gets smaller as it travels away from the light pipe 98, converging on itself. The major axis shrinks faster than the minor axis, eventually disappearing to leave a horizontal image a-a' of the minor axis. As the beam continues away from that point, the result is an elliptic image with the major axis getting larger as indicated by the vertical line b'-b at a focal plane FP.

As the beam leaves the location of a-a' the minor axis continues to shrink until it is the same length as is the increasing major axis, resulting in a circular image. At a point still further along the path of the beam, the minor axis disappears and the image is a vertical line b'-b. If the beam were to continue further, the result would be an ellipse of ever increasing size which has been rotated 180 degrees.

For the purpose of measuring distance, the region of interest is that between the formation of the line a-a' and the line b'-b. The images that are formed in this region are reflected back onto the peripheral light pipes or fibers 102, 104, 106 and 108 which conduct the images back to the detectors 90, 92, 94 and 96 to produce a group of signals which represent the "pattern" which is seen on the paper and thus the distance from the end of the light pipe 98 to the surface of the web.

It will readily be apparent that by taking the ratios of oppositely disposed pairs of the detectors 90, 92, 94 and 96 and then taking the ratio of these ratios, a measurement of the size of the ellipse can be obtained which size is proportional to the distance of the surface of the web indicated by FP in FIG. 6 from the end of the light pipe 98.

Referring to FIG. 7, we have illustrated the three extreme conditions of the image in the region of measurement in the respective sub-figures (a) (b) and (c) by broken lines.

The technique just described which employs the fiber optic system including the light pipes or fibers 98, 102, 104, 106 and 108 permits the electronics to be further removed from the hostile environment of web production. Further, by taking the ratios of detectors associated with opposite light pipes, reflectivity changes brought about by color, reflectivity, or opacity changes or other similar variations, as well as dirt buildup, will be normalized out. The distance measurement obtained by the arrangement of FIGS. 5 to 7 can be used to energize the mechanism 28 or a similar mechanism to maintain a constant distance between the undersurface of web 14 and the upper surface of disc 48 for example. This measurement technique with fiber optics could also be used for the simultaneous measurement of more than one web position using multiple fiber bundles and array detector packages with image processing algorithms.

Figure 8:
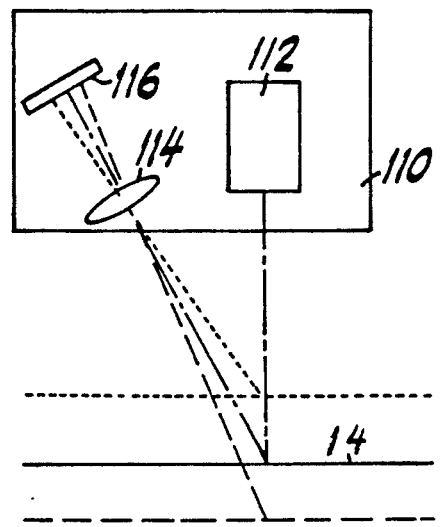
FIG. 8 is a schematic view illustrating a further form of distance measuring device which we may utilize in our web thickness sensor.

It may be that for thicker material a triangulation optical distance measurement has sufficient sensitivity. Such a method also may be required if the surface irregularities of the material are greater than the dynamic range of the more highly sensitive optical distance measuring methods just described. Referring now to FIG. 8, by way of example we have shown a triangulation distance measurement device 110 which may include a laser light source 112 for directing a beam of light onto the surface of the web 14. Light reflected from the surface of the web 14 is transmitted by a lens 114 onto the surface of a multi-element detector 116.

In operation of such a triangulation measurement system, the point on the detector 116 at which the reflected light impinges is determined by the distance of the web 14 from the source 112. If for example the web 14 is at the position indicated by a full line in FIG. 8, the reflected beam travels along the dot-dash path to impinge on a first point on the detector 116. If the web is further away as indicated by the broken line, then the reflected light travels along the broken line path to impinge on detector 116 at a point to the right of the point of impingement illustrated by the dot-dash line. Further, if the web 14 were nearer the source 112, as indicated by the dotted line, reflected radiation would travel along the dotted line to impinge on detector 116 at a point to the left of the point of impingement of the dot-dash line. We have discovered that with the triangulation method, the resolution is as good as two microns with a standoff distance of five inches and a measurement range of about 0.5 inches. For larger measurement ranges, the resolution is lower. While such a low resolution is inadequate for paper and other thin products, it may be satisfactory for thicker materials such as paperboard and construction material such as ceiling tile. Again, the measurements obtained by triangulation may be used to operate a servomechanism such as the mechanism 28.

Figure 9:
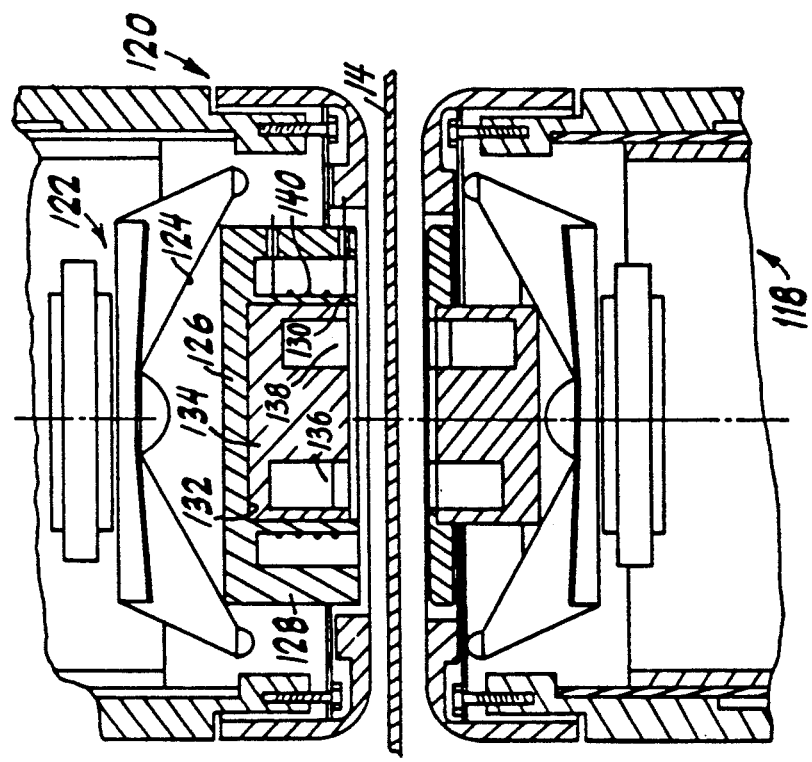
FIG. 9 is a sectional view of a totally non-contacting version of our improved web thickness sensor.

Referring now to FIG. 9, we have shown a completely non-contacting form of on line thickness sensor. In the arrangement illustrated in the Figure, the lower head indicated generally by the reference character 118, is identical to the lower head 10 in the form of our invention illustrated in FIG. 1. The upper head indicated generally by the reference character 120 is out of contact with the upper surface of the web 14. This upper head 120 houses a servo-mechanism indicated generally by the reference character 122 similar to the servomechanism 28 of the form of our invention illustrated in FIG. 1. The cone or moveable element 124 of the servomechanism 122 carries for movement therewith a ferrite core 126 having a peripheral annular portion 128 and a central generally cylindrical portion 130. We form the cylindrical pole piece 130 with a recess 132 for receiving a body 134 carrying a pair of distance measuring units 136 and 138, the operation of which is analogous to that of the units 40 and 42. Pole piece 130 carries a winding 140 similar to the winding 64 in the upper head 12 of the form of our invention illustrated in FIG. 1.

In operation of the form of our invention illustrated in FIG. 1, the ferrite plate 48 and the core 56 carrying the winding 64 make up a distance measuring device of the variable inductance type in which the inductance between conductors 66 and 68 is a measure of the separation between the disc 48 and the core 56. Owing to the fact that the head 12 always is in contact with the upper surface of the sheet 14 and that the core 56 is in a fixed position on the head 54, the core is at a fixed distance from the upper surface of the sheet 14.

As has been explained hereinabove, the two optical distance measuring devices 40 and 42 so control the energization of the mechanism 28 as to maintain a predetermined distance between the lower surface of the sheet 14 and the upper surface of the disc 48. Thus, if the lower surface of the sheet 14 comes closer to the upper surface of disc 48, the devices 40 and 42 cause such a signal to be applied to conductors 34 and 36 as to move the disc away from the sheet 14. Conversely, if the undersurface of the sheet 14 moves away from the disc 48, the mechanism 28 is actuated to move the disc closer to the undersurface of the sheet. In this way the disc 48 is maintained at a predetermined distance from the underside of the sheet 14. The reluctance between conductors 66 and 68 is a measure of the distance between the disc 48 and the core 56. Since both the distance between plate 48 and the underside of sheet 14 and the distance between the core 56 and the upper surface of the sheet 14 are held constant, the reluctance between conductors 66 and 68 is a measure of the thickness of the sheet.

The operation of the head 118 in the form of our invention illustrated in FIG. 9 is the same as that of head 10 of FIG. 1. The operation of the head 120 which is out of contact with the upper surface of the sheet 14 is analogous to the operation of head 10 in that the servomechanism 122 in response to the outputs of the detector emitter pairs 136 and 138 maintains a predetermined constant distance between the core 126 and the upper surface of sheet 14. Again, since the distance between the ferrite plate of head 118 and the undersurface of sheet 14 and the distance between the core 126 and the upper surface of sheet 14 are maintained constant, the reluctance of winding 140 is a direct measure of the thickness of the sheet 14.

As has been pointed out hereinabove, it will readily be apparent that the other optical distance measuring devices illustrated in FIGS. 5 and 8 can be substituted for the devices 136 and 138.

It will be seen that we have accomplished the objects of our invention. We have provided an on line web thickness measuring apparatus which is more accurate than are systems of the prior art. In our apparatus either one or both of the sensing heads is maintained out of contact with the web. Our system is more reliable than are web thickness sensing systems of the prior art. It is especially adapted for measuring the thickness of thin webs or sheets. It compensates for web movement and frame distortion as well as for dust accumulation, reflectivity changes, color shade changes and sheet opacity changes.

It will be understood that certain features and subcombinations are of utility and may be employed without reference to other features and subcombinations. This is contemplated by us and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for measuring the thickness of a sheet of nonconductive material including in combination means comprising first and second interacting electromagnetic elements disposed on opposite sides of said sheet for producing a sensible indication of the distance therebetween, sheet surface contacting means for maintaining said first interacting element at a constant distance from one surface of said sheet and noncontacting servomechanism means for automatically maintaining said second interacting element at a constant distance from the other surface of said sheet, said noncontacting servomechanism means comprising optical means for producing a positioning signal as a measure of the distance between said second interacting element and said other surface of said sheet and means responsive to said positioning signal for positioning said second interacting element.

2. Apparatus as in claim 1 in which said servomechanism comprises optical means for measuring the distance between the second interacting element and the other surface of the sheet, said optical means comprising light pipes extending from a location adjacent to said other surface to a location relatively remote from said other surface.

3. Apparatus as in claim 1 in which said optical means comprises a first emitter-detector pair for emitting radiation toward said other surface and detecting radiation reflected from said surface to produce a first signal as a measure of the distance of said first pair from said other surface, a second emitter-detector pair for emitting radiation toward said other surface and detecting radiation reflected from said surface to produce a second signal as a measure of the distance of said second pair from said other surface and means mounting said first and second pairs on said second interacting element at such a differential distance from said other surface that said second interacting element is at said constant distance when said first and second signals are equal.

4. Apparatus as in claim 3 in which said positioning means comprises a movable member, positioning signal responsive means for moving said member, and means for applying the difference between said first and second signals to said signal responsive means.

5. Apparatus as in claim 3 in which said positioning means comprises a movable member, positioning signal responsive means for moving said member and means including means for determining the ratio of said first and second signals for feeding a signal to said signal responsive means.

6. Apparatus as in claim 1 in which said optical means comprises a hologram or lens arrangement, a laser for directing a beam of light through said hologram or lens arrangement onto said other surface of said sheet and means responsive to light reflected from said surface for affording a measure of the distance of said second interacting element from said other surface.

7. Apparatus as in claim 6 in which said means responsive to said reflected light comprises four detectors arranged symmetrically around said laser.

8. Apparatus as in claim 7 in which said optical means comprises a central light pipe extending from said laser to a location adjacent to said other surface and respective light pipes arranged symmetrically around said central light pipe for conducting reflected light from said other surface to said detectors, said hologram or lens arrangement being carried by the end of said central light pipe adjacent to said other surface.

9. Apparatus as in claim 1 in which said servomechanism comprises an optical means for measuring the distance between said second element and the other surface of the sheet by the triangulation method.

10. Apparatus as in claim 1 in which said first element is a ferromagnetic core carrying a winding and the second element is a body of ferromagnetic material.

11. Apparatus for measuring the thickness of a travelling sheet of nonconductive material including in combination a first head, a second head, means mounting said heads in spaced relationship on opposite sides of said sheet with the first head in contact with one surface of the sheet and the second head out of contact with the sheet, a ferromagnetic core, a winding carried by said core, means mounting said core on one of said heads, a body of ferromagnetic material, and a noncontacting servomechanism mounting said body on the other head, said noncontacting servomechanism automatically maintaining said body a predetermined distance from said sheet whereby the reluctance of said coil is a measure of the distance between said body and said coil, said servomechanism comprising optical means for measuring the distance between said body and the surface of said sheet adjacent to said other head and means responsive to said optical means for positioning said body whereby the reluctance of said coil is a measure of the thickness of the sheet.

12. Apparatus as in claim 11 in which said servomechanism comprises a movable member supporting said body and in which said optical means comprises a first emitter-detector pair for emitting radiation toward said other surface and detecting radiation reflected from said surface to produce a first distance signal as a measure of the distance of the first pair from said sheet surface, a second emitter-detector pair for emitting radiation toward said other surface and detecting radiation reflected from said surface to produce a second signal as a measure of the distance of said second pair from said sheet surface and means mounting said first and second pairs on said movable member at such a differential distance from said surface that said body is at said predetermined distance when said first and second signals are equal.

13. Apparatus for measuring the thickness of a sheet of nonconductive material including in combination interacting first and second electromagnetic means for producing an indication which is a measure of the distance therebetween, said first and second electromagnetic means being disposed on opposite sides of said sheet, a first noncontacting servomechanism for automatically maintaining said first electromagnetic means at a constant distance from one surface of said sheet, said first servomechanism comprising optical means for producing a first positioning signal as a measure of the distance between said first electromagnetic means and said one surface of said sheet and means responsive to said first positioning signal for positioning said first electromagnetic means, and a second noncontacting servomechanism for automatically maintaining said second electromagnetic means at a constant distance from the other surface of said sheet whereby the indication produced by said first and second electromagnetic means is an indication of the thickness of said sheet, said second servomechanism comprising optical means for producing a second positioning signal as a measure of the distance between said second electromagnetic means and said other surface of said sheet and means responsive to said second positioning signal for positioning said second electromagnetic means.

14. Apparatus as in claim 13 in which one of said servomechanisms comprises a movable member, signal responsive means for moving said movable member, a first optical emitter-detector pair for emitting light toward said surface and detecting light reflected from said surface to produce a signal as a measure of the distance of said first pair from the adjacent sheet surface, a second optical emitter-detector pair for emitting light toward said surface and detecting light reflected from said surface to produce a second signal as a measure of the distance of said second pair from said adjacent sheet surface and means mounting said first and second pairs on said movable member at such a differential distance from said surface that the corresponding first or second means is at said constant distance.

15. A method for measuring the thickness of a nonconductive sheet having opposite surfaces with a pair of interacting elements adapted to produce a sensible indication of the distance therebetween including the steps of positioning said interacting elements respectively adjacent to said opposite sides of said sheet, maintaining one of said interacting elements at a fixed distance from one surface of said sheet, optically measuring the distance between the other surface of said sheet and the other interacting element and maintaining said other interacting element at a constant distance from said other sheet surface in response to said measuring step whereby said indication is a measure of sheet thickness.

* * * * *